United States Patent
Faruquie et al.

(10) Patent No.: US 9,697,301 B2
(45) Date of Patent: Jul. 4, 2017

(54) SYSTEMS AND METHODS FOR STANDARDIZATION AND DE-DUPLICATION OF ADDRESSES USING TAXONOMY

(75) Inventors: Tanveer Afzal Faruquie, New Delhi (IN); Sachindra Joshi, New Delhi (IN); Hima Prasad Karanam, New Delhi (IN); Mukesh Kumar Mohania, Rajpur Chung (IN); Sriram K. Padmanabhan, San Jose, CA (US); L. Venkata Subramaniam, Gurgaon (IN)

(73) Assignee: International Business Machines Corporation, Armonk, NY (US)

(*) Notice: Subject to any disclaimer, the term of this patent is extended or adjusted under 35 U.S.C. 154(b) by 766 days.

(21) Appl. No.: 12/859,607

(22) Filed: Aug. 19, 2010

(65) Prior Publication Data

US 2012/0047179 A1 Feb. 23, 2012

(51) Int. Cl.
*G06F 17/30* (2006.01)

(52) U.S. Cl.
CPC .............. *G06F 17/30961* (2013.01)

(58) Field of Classification Search
CPC .......... G06F 17/30961; G10L 15/193
See application file for complete search history.

(56) References Cited

U.S. PATENT DOCUMENTS

| | | | |
|---|---|---|---|
| 7,366,726 B2 | 4/2008 | Bellamy et al. | |
| 8,032,546 B2* | 10/2011 | Arasu et al. | 707/769 |
| 2004/0260543 A1* | 12/2004 | Horowitz | G10L 15/193 704/221 |

FOREIGN PATENT DOCUMENTS

| | | |
|---|---|---|
| WO | 00/57258 | 9/2000 |
| WO | 02/041186 | 5/2002 |

OTHER PUBLICATIONS

Herbert et al., "Biological Data Cleaning: A Case Study", Int. J. Information Quality, vol. 1, No. 1, pp. 60-82, Inderscience Enterprises Ltd, 2007.*

Borkar et al., "Automatically Extracting Structure From Free Text Addresses", Bulletin of the Technical COmmittee on Data Engineering, vol. 23, No. 4, pp. 27-32, IEEE, 2000.*

Murthy, Karin et al., "Automatically Generating Term-frequency-induced Taxonomies", Proceedings of the ACL 2010 Conference Short Papers, Jul. 2010, pp. 126-131, 2010 Association for Computational Linguistics, Uppsala, Sweden.

(Continued)

*Primary Examiner* — Tarek Chbouki (74) *Attorney, Agent, or Firm* — Ference & Associates LLC (57) ABSTRACT

Systems and associated methods for address standardization and applications related thereto are described. Embodiments exploit a common context in a taxonomy and a given address to detect and correct deviations in the address. Embodiments establish a possible path from a root of the taxonomy to a leaf in the taxonomy that can possibly generate a given address. Given a new address, embodiments use complete addresses, and/or segments or elements thereof, to compute the representations of the elements and find a closest matching leaf in the taxonomy. Embodiments then traverse the path to a root node to detect the agreement and disagreement between the path and the address entry. Taxonomical structured is thus used to detect, segregate and standardize the expected fields.

18 Claims, 10 Drawing Sheets

(56) References Cited

OTHER PUBLICATIONS

Broder, Andrei Z., "Identifying and Filtering Near-Duplicate Documents," Proceeding COM '00 Proceedings of the 11th Annual Symposium on Combinatorial Pattern Matching, 2000, pp. 1-10, vol. 1848 archive, ACM, Springer-Verlag, Berlin, Heidelberg, Germany.

Cochinwala, M.; Dalal S.; Elmagarmid, A. K.; and Verykios, V.S., "Record Matching: Past, Present and Future", CDS TR #01-013, Jul. 2001, available at http://128.10.19.20/research/technical_reports/2001/TR%2001-013.pdf.

"Data Migration Services", available at http://74.125.153.132/search?q=cache:http://www.itabode.com/html/ourapproach.htm, as of Apr. 29, 2010.

Missi, Farouk; Alshawi, Sarmad; and Irani, Zahir, "The Way Forward to a Successful Customer Relationship Management", Informing Science, InSITE—"Where Parallels Intersect", Jun. 2003, available at http://citeseerx.ist.psu.edu/viewdoc/download?doi=10.1.1.9.5846&rep=rep1&type=pdf.

\* cited by examiner

FIG. 1A

| Door No. | Area | City | Pin Code |
|---|---|---|---|
| 1461/B1 | Vasant Kunj | N Delhi | 23 |
| 1461 Sector B1 | V. Kunj | New Delhi | 110023 |
| Ho 1461 Sec. B1 | Vsnt Kunj | New Delhi | 110023 |

104A — Door No.
105A — Area
106A — City
107A — Pin Code 101A, 102A, 103A

FIG. 1B

| Building No. | Street | Area | City |
|---|---|---|---|
| BG/6D | Malad Goregaon Road | Malad | Mumbai |
| Bldg BG, Blk 6D | Malad Link Rd. | Malad | Mumbai |

103B — Building No.
104B — Street
105B — Area
106B — City 101B, 102B

| | 104C / Door No. | 105C / Street | 106C / Locality | 107C / Area | 108C / City | 109C / Pin Code |
|---|---|---|---|---|---|---|
| 101C | House No 516 | 12th Street | | Sadar Bazar | Jabalpur | 482001 |
| 102C | Ho. No 516 | St. No. 12 | Cantonment | Sadar Bazar | Jbp | 482001 |
| 103C | House No 516 | Street No 12 | | Sadar Bazar | Jabalpur | 482003 |

SYSTEMS AND METHODS FOR STANDARDIZATION AND DE-DUPLICATION OF ADDRESSES USING TAXONOMY

BACKGROUND

In many parts of the world, such as in developing countries, there are no established standards for representation of postal addresses. This can lead to confusion, non-uniform representation and unnecessary duplication of address entries in databases.

Existing data management and address cleansing tools help organizations ensure that their strategic systems, including data warehouses, deliver accurate, complete information to business users across the enterprise. Equipped with trusted information, organizations can make more timely and better informed decisions. Existing tools include for example a graphical user interface (GUI) and capabilities that can be customized into specific business rules, offer some control over international names, addresses, phone numbers, birth dates, email addresses, and other descriptive fields. Existing tools are designed to discover relationships among database entries in an enterprise and/or Internet environment, both in batch mode and in real-time. Using existing tools, companies hope to gain access to accurate, consistent, consolidated views of any individual or business entity and its relationships.

BRIEF SUMMARY

The subject matter described herein generally relates to systems and methods for address standardization and applications related thereto. Embodiments exploit a common context in a taxonomy and a given address to detect and correct deviations in the address. Embodiments establish a possible path from a root of the taxonomy to a leaf in the taxonomy that can possibly generate a given address. In leaf nodes of the taxonomy, embodiments store a set of n-grams or signatures of that path. Given a new address, embodiments use complete address or segments or elements of an address entry to compute the n-grams and find a closest matching leaf in the taxonomy. Embodiments then traverse the path to a root node to detect the agreement and disagreements between the path and the address entry. Taxonomical structure is thus used to detect, segregate and standardize the expected fields. Any extra/additional information in an address entry, such as a landmark, is detected as optional information that can be included/excluded as desired.

In summary, one aspect provides a method comprising: accessing a stored taxonomy representing addresses, the taxonomy comprising signatures of addresses; receiving one or more address entries as input; and utilizing one or more processors to execute a program of instructions configured to: compute a signature for the one or more address entries; match the one or more address entries with one or more signatures of addresses of the taxonomy; and standardize the one or more address entries based on the taxonomy.

Another aspect provides a computer program product comprising: a computer readable storage medium having computer readable program code embodied therewith, the computer readable program code comprising: computer readable program code configured to access a stored taxonomy representing addresses, the taxonomy comprising signatures of addresses; computer readable program code configured to receive one or more address entries as input; computer readable program code configured to compute a signature for the one or more address entries; computer readable program code configured to match the one or more address entries with one or more signatures of addresses of the taxonomy; and computer readable program code configured to standardize the one or more address entries based on the taxonomy.

A further aspect provides a system comprising: one or more processors; and a memory operatively connected to the one or more processors; wherein, responsive to execution of computer readable program code accessible to the one or more processors, the one or more processors are configured to: access a stored taxonomy representing addresses, the taxonomy comprising signatures of addresses; receive one or more address entries as input; compute a signature for the one or more address entries; match the one or more address entries with one or more signatures of addresses of the taxonomy; and standardize the one or more address entries based on the taxonomy.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

As used herein, an address, address entry or the like refers to a physical address, such as a postal or mailing address, and the like. As used herein, an element is a component/field of an address entry, such as a street name, a city name, and the like. As used herein, standardization is the process of identifying elements of an address and representing these elements in a standardized/canonical form.

Conventional database management/address cleansing tools take data from disparate sources and attempt to standardize it into standardized, fixed fields using business driven rules to assign the correct semantic meaning to input data in order to facilitate matching, de-duplication, et cetera. Thus, once standardized, matching capabilities can be employed to detect duplication and other relationships in the data despite anomalous, inconsistent, and/or missing data values in the raw address entries. A statistical matching engine can, for example, assess the probability that two or more sets of data values refer to the same business entity, providing more accurate match results.

The inventors have recognized, however, that conventional tools are confounded by complex addresses and/or complex addressing schemes, for example in areas where there is no clear standard addressing format and/or standard address elements. Moreover, certain address data itself is not clean. For example, the same address is often written in multiple ways, and there are often no standard elements in an address. Thus, the same address may be considered acceptable as written in different ways, that is, utilizing different elements such as street name, building number, sector, area, locality, landmark, district, country, et cetera. Moreover, even if the same elements happen to be utilized, there is often no fixed sequence/ordering in which the elements appear in an address. Still further, the sequence/ordering (structure) of the addresses varies across regions. Yet another difficulty is that often landmarks are mentioned as part of addresses using a variety of formats (for example, different abbreviations, spellings and the like). Thus, individuals intent on indicating the same address often combine variations of elements in a variety of ways (left to right organization). Thus, many different combinations produce a variety of address variants.

The inventors have recognized that unlike countries with an accepted standard, for example the United States or certain European countries where postal standards can be used to correct addresses, in developing countries the problem is particularly acute, as there are not even any established standards. Thus, users often have to rely on other knowledge sources and manual intervention and creation of a variety of rules to standardize addresses.

Accordingly, embodiments utilize a taxonomy-based approach to standardization of addresses. Doing so helps in achieving higher level analytic applications, for example database cleansing and matching applications that are based on the notion of having a single view of an entity as a starting point. Thus, embodiments improve on current solutions that are ad hoc and use handcrafted rules/manual intervention for each data source/address type.

The description now turns to the figures. The illustrated example embodiments will be best understood by reference to the figures. The following description is intended only by way of example and simply illustrates certain selected example embodiments representative of the invention, as claimed.

Figure 1A:
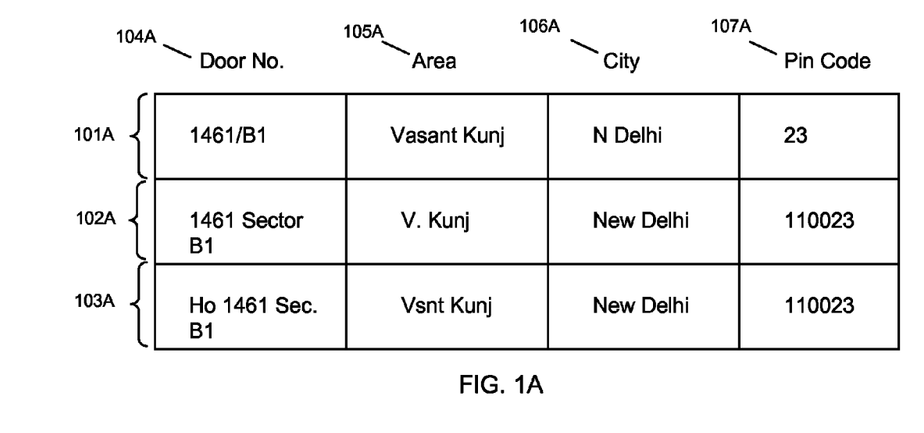
FIG. 1A-C illustrates example variants of addresses.
Figure 1B:
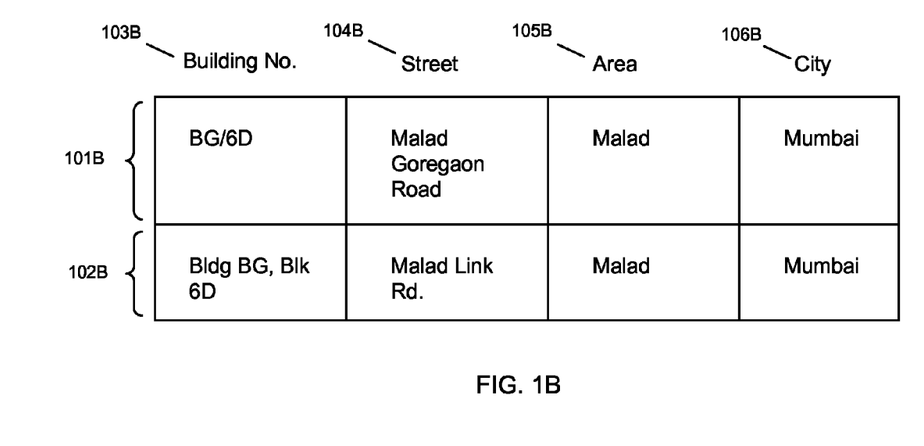
Figure 1C:
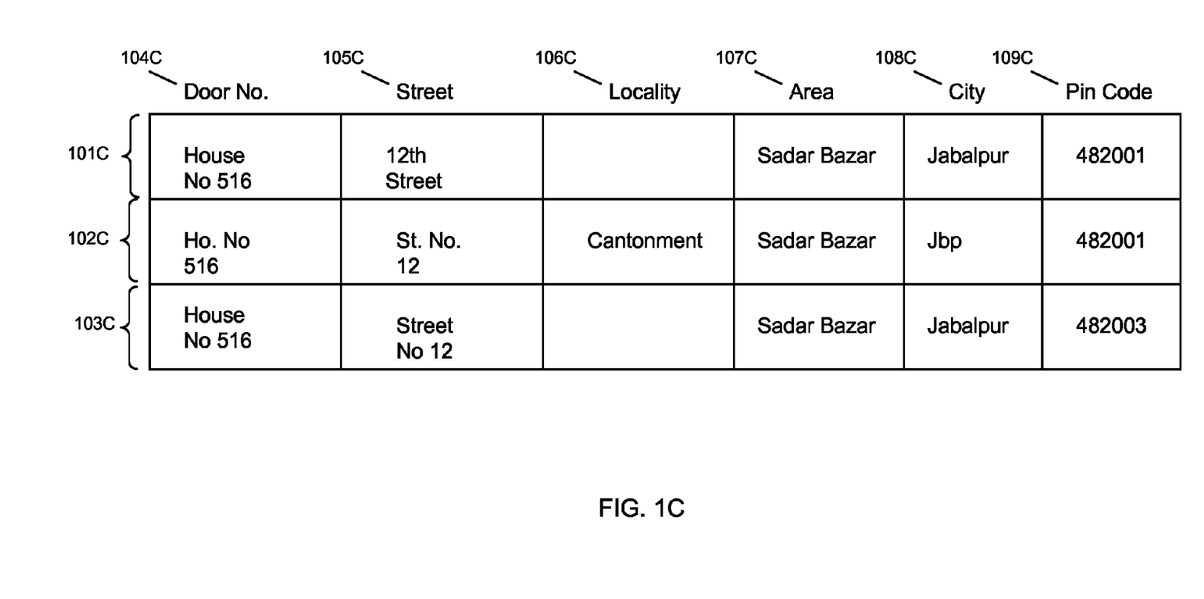

Referring to FIG. 1A-C, each of FIG. 1A-C represents variants of an address (one address for each FIG. 1A, FIG. 1B, and FIG. 1C, respectively). Thus, in FIG. 1A an address is represented by three variations 101A, 102A, 103A. Address variant 101A contains the elements Door No. 104A, Area 105A, City 106A and Pin Code 107A as "1461/B1", "Vasant Kunj", "N Delhi" and "23", respectively. Address variant 102A contains the same elements (104A-107A) as well, but as "1461 Sector B1", "V. Kunj", "New Delhi" and "110023", respectively. And Address variant 103A contains the same elements (104A-107A) as well, but as "Ho 1461 Sec. B1", "Vsnt Kunj", "New Delhi", and "110023", respectively. Thus, the same address has three variant entries (101A, 102A, 103A), which contain variations of the same elements (for example, all elements in the three variant entries 101A, 102A, 103A exhibit variation at some level). No standardized address for correcting these three address variants 101A, 102A, 103A is available from an outside authority, such as a postal office. Moreover, there is no clear indication as to which address variant should be chosen as a standard.

Similarly, FIG. 1B illustrates two variants 101B, 102B of the same address. Address variant 101B includes elements 103B, 104B, 105B and 106B as "BG/6D", "Malad Goregaon Road", "Malad" and "Mumbai", respectively. Similarly, address variant 102B includes the same elements (103B-104B), but as "Bldg BG, BLK 6D", "Malad Link Rd.", "Malad", and "Mumbai", respectively. Again, the address elements 103B and 104B exhibit variation, and no clear standard is apparent.

In FIG. 1C, an address is represented as three variants 101C-103C, with each of the elements 104C-109C having some variation. As illustrated, variant 101C and 103C do not contain element 106C (locality, "Cantonment"), whereas variant 102C does contain a locality entry. Moreover, address variant 103C contains an incorrect pin code element 109C "482003", whereas address variants 101C and 102C have the proper pin code element 109C "482001". Such missing and incorrect elements generate increased complexity for the address, in addition to the complexity introduced into the elements by more common variations (such as utilization of different abbreviations, use of different organization of elements from left to right, use of different punctuation, et cetera).

Embodiments deal with such complexities in address variants by utilizing a taxonomy-based approach to address standardization. Given a corpus of address entries (such as stored in a database), embodiments can learn a "best" address to use as a standard, and moreover can standardize complex address entries against this standard. Such processing of raw address entries enables useful applications (such as a de-duplication application) to be utilized, even if the input/raw addresses are complex addresses and there is no clear, accepted standard for elements or organization thereof.

Figure 2:
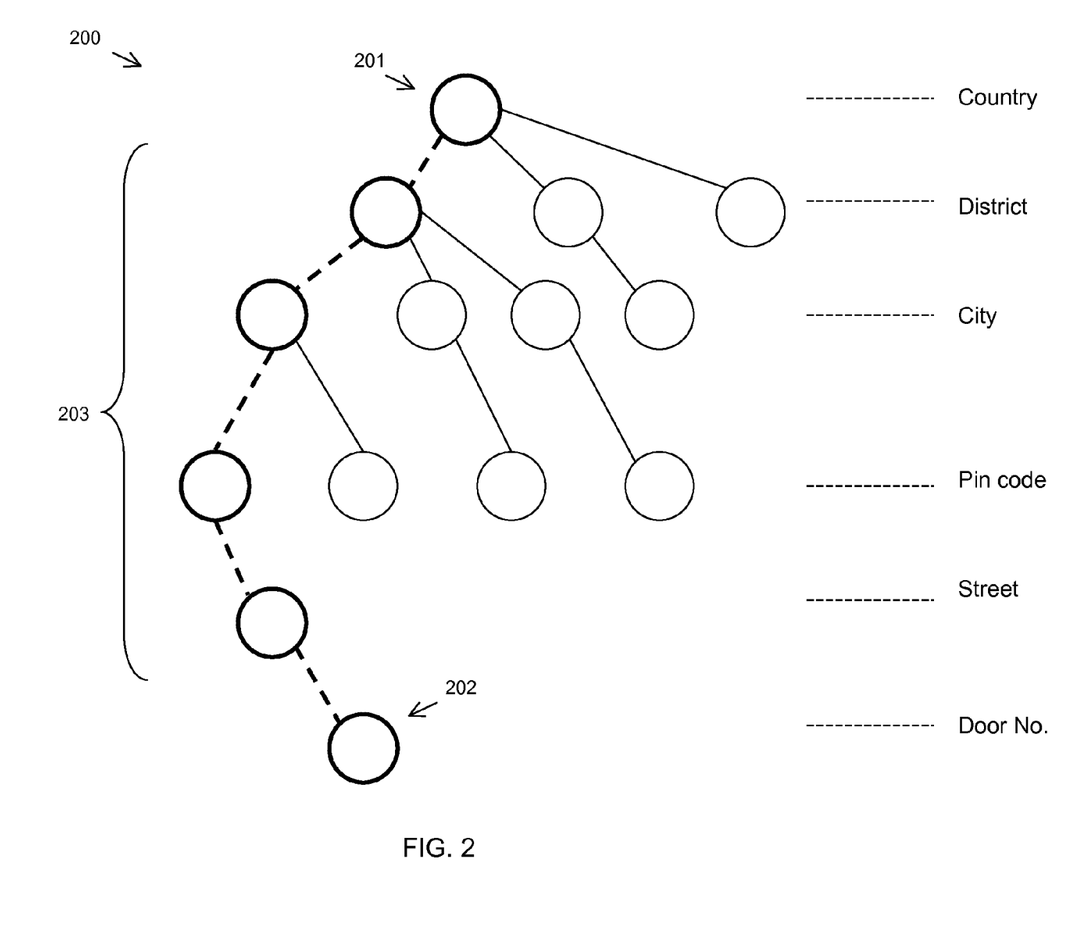
FIG. 2 illustrates an example taxonomy structure.

Referring to FIG. 2, embodiments employ a taxonomic representation of an address set. Addresses can be represented in a taxonomy 200, with elements of the addresses corresponding to nodes 201, 202, 203 of the taxonomy 200. A taxonomy 200 is a division into ordered groups or categories, that is, a structured representation of particular things. In FIG. 2, the nodes 201, 202, 203 correspond to elements of an address, with a root node 201 forming a path to a leaf node 202 via one or more intermediate nodes 203. Thus, the taxonomy 200 can be represented as a tree structure, with the root node 201 connecting all other nodes in the tree, and thus corresponding to an element shared by all addresses of the taxonomy (for example, the "Country" element), and the leaf node 202 being unique to a particular address (for example, the "Door No." element). The intermediate nodes 203 may or may not be shared by multiple addresses, depending on the particular path each address corresponds to and the number of elements it contains.

An example path through the taxonomy 200 is illustrated in FIG. 2, corresponding to the dashed line connections from the root node 201 to the leaf node 202 via intermediate nodes 203. The example taxonomy includes nodes for elements corresponding to "Country", "District", "City", "Pin Code", "Street" and "Door No.". Other node levels are possible and can be used for a given dataset. For example, some addresses will be represented by a taxonomy including some or all of the following node levels: a country node level, district/state node level, city node level, area node level, pin code node level, locality node level, street node level, building node level, floor node level, and door number node level. Of course, other node levels are possible depending on the dataset used to form taxonomies, and as will be clear from the further description of example embodiments herein, it is not necessary that a taxonomy include all possible node levels. A taxonomy can be populated with a large collection of available parsed addresses, for example, a collection of electoral records, land records or post office data, to learn a standardized address form, as further described herein. Taxonomies can be externally generated, for example via an automated processing of available records, as is described in various prior works. Given one or more taxonomies, once a standard has been identified, it can be used to compare against other address entries for standardization and higher level analytic techniques.

Figure 3:
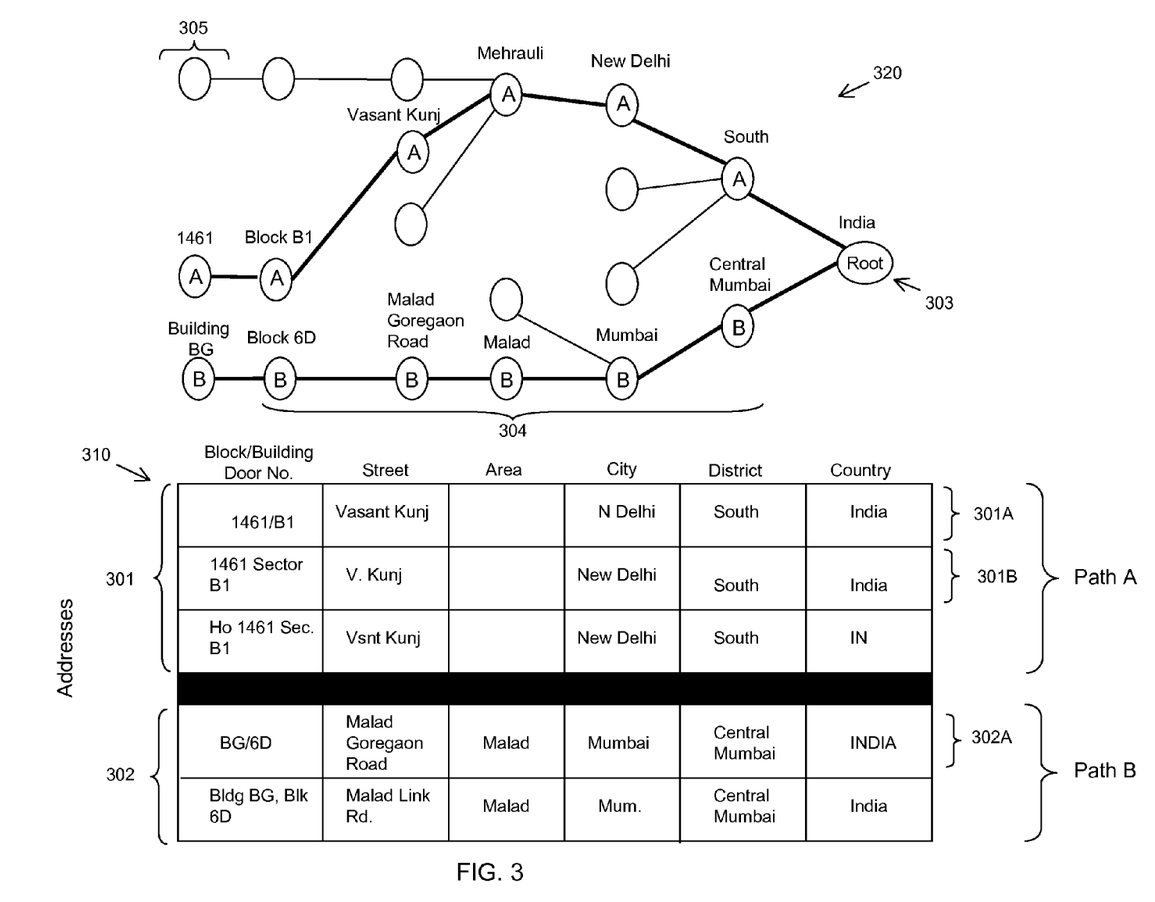
FIG. 3 illustrates an example of a relationship between addresses and variants thereof and a taxonomy.

FIG. 3 illustrates relationships between a taxonomy and addresses. Two addresses 301, 302 are illustrated. Address 301 has three variants, while address 302 has two variants. The addresses 301, 302 are stored as separated elements in a table 310.

The taxonomy 320 includes a root node 303, intermediate nodes 304, and leaf nodes 305. The taxonomy includes multiple paths including Path A and Path B. Each path represents an address (standardized form thereof). Address variant 301A for example corresponds to Path A. The table elements of address variant 301A correspond to the nodes of Path A. For example, table element value "India" of variant 301A corresponds to the root node 303 "India", table element value "N Delhi" of variant 301A corresponds to the intermediate node 304 "New Delhi", and so on down the path. The Path A leaf node "1461" corresponds to table element value "1461/B1" of address variant 301A. Note that address variant 301A lacks a value entry for table element "Area", whereas the taxonomy 320 contains an intermediate node 304 corresponding thereto ("Mehrauli"). Even though a given address 301 lacks an element, embodiments can still identify a correct path and use the path in the taxonomy 320 to implement missing value filling operations, as described further herein.

Similarly, for address variant 302A, a path in the taxonomy 320 represents the address. Address variant 302A for example corresponds to Path B. The table elements of address variant 302A correspond to the nodes of Path B. For example, table element value "INDIA" of variant 302A corresponds to the root node 303 "India", table element value "Central Mumbai" of variant 302A corresponds to the intermediate node 304 "Central Mumbai", and so on down the path. The Path B leaf node "Building BG" corresponds to table element value "Building BG, Blk 6D" of address variant 302A. Note that although table element values for address variant 302A do not match exactly taxonomy nodes (for example, leaf node "Building BG" does not exactly correspond to table element value "Building BG, Blk 6D"), embodiments still match the correct table element value to the correct node, as described further herein.

Clusters for the same element/field values will have a degree of similarity in the surrounding context (left and right as illustrated in the table). Duplicate address entries (variants, such as address variant 301A, 301B) will share left and right contexts. Addresses entries which are not duplicates, for example address entries 301, 302, may share some or all of the same right context, but will not share certain portions of left context (for example, the leaf nodes will be different). For example, address variant 301A and address variant 301B have different element values for certain elements; however, each shares the same context. Similarly, if the address element values and the taxonomy node values are processed, for example subjected to an n-gram processing step, the processed versions of the elements will also demonstrate similarity because of this context. Such n-gram sharing between elements occurs because elements share the same surrounding context. Thus, a maximal number of n-grams matching between the elements of variants 301A and 301B with the n-grams of a unique path in the taxonomy 320 can be used to indicate that each variant maps to that particular path. If the variants are indeed duplicates, they will exhibit a higher degree of n-gram matching as compared to two different addresses, which will have left context n-grams that do not match. Moreover, an address entry with maximum match to a path in the taxonomy will indicate that the address entry is indeed represented by that path.

Figure 4:
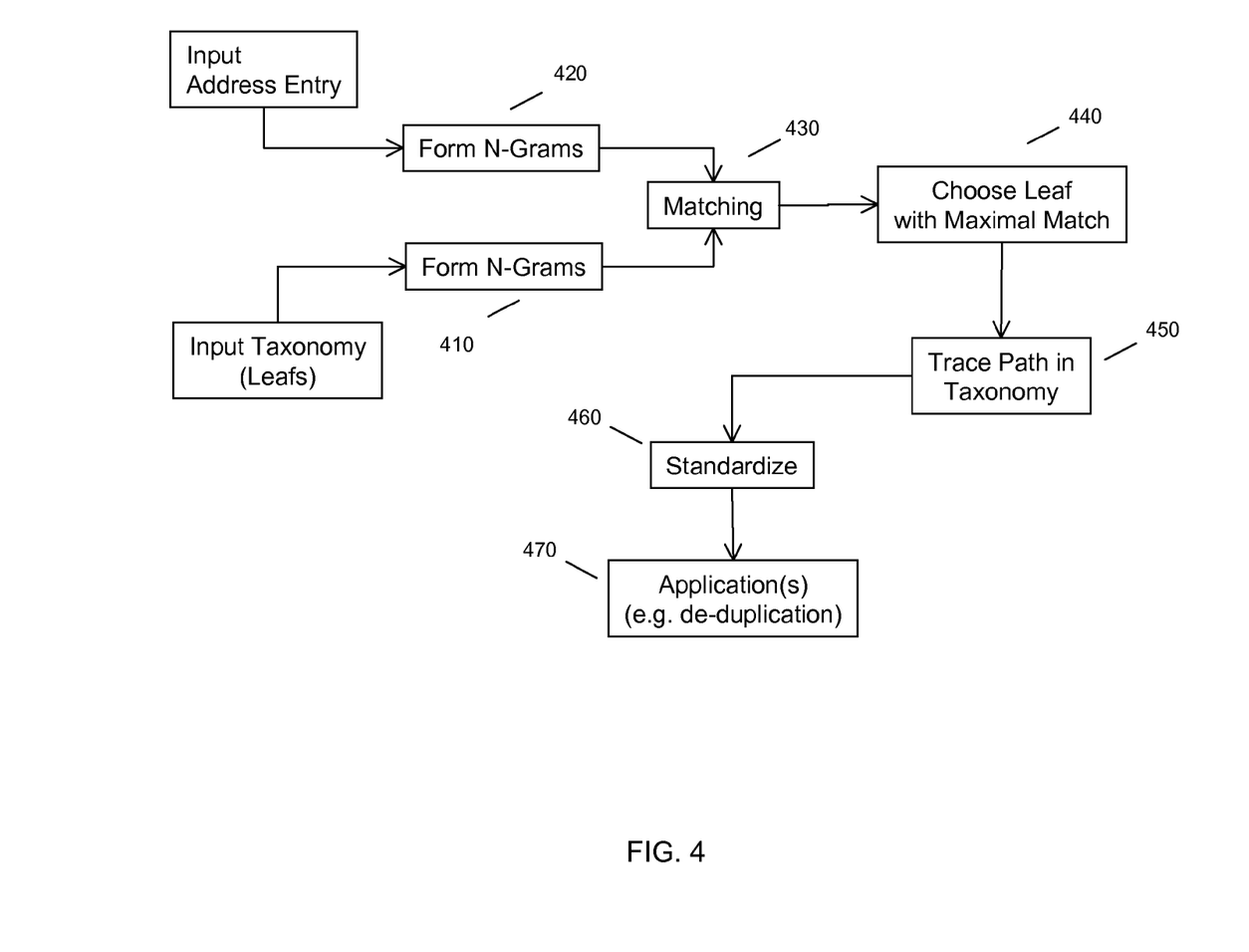
FIG. 4 illustrates an example method of address standardization and de-duplication.

To organize the raw addresses into an element table as in FIGS. 3-4, embodiments can standardize address entries by matching the address entry to a leaf node in the taxonomy, which will also provide a segmentation of the raw address entry into elements. Thus, once a leaf node match is found, tracing the path through the taxonomy back to the root node yields the appropriate element values.

Referring to FIG. 4, in order to match an address entry to a particular leaf node, for example, n-grams for the leaf nodes are formed 410. N-grams can be computed at the character level. For example, an n-gram for the leaf "Khalsa High School" in the taxonomy 320 of FIG. 3 could include n-grams for the leaf node as well as n-grams for each node in the path, including the root node. N-grams for address entries (such as raw addresses from a database) are also formed 420. A similarity computation is conducted 430 to establish a similarity level between a given address entry's n-grams and those of the leafs of the taxonomy. For example, shingling can be performed to create a signature that can be used for signature based matching. A leaf matching an n-gram of the address entry maximally is considered a match 440. Embodiments can then trace the path in the taxonomy to the root node 450 to discover the appropriate address element values (that is, use the node values from the taxonomy). Given the appropriate address element values, standardization 460 and application (for example, de-duplication, conducting business intelligence queries, et cetera) can be performed 470.

Figure 5:
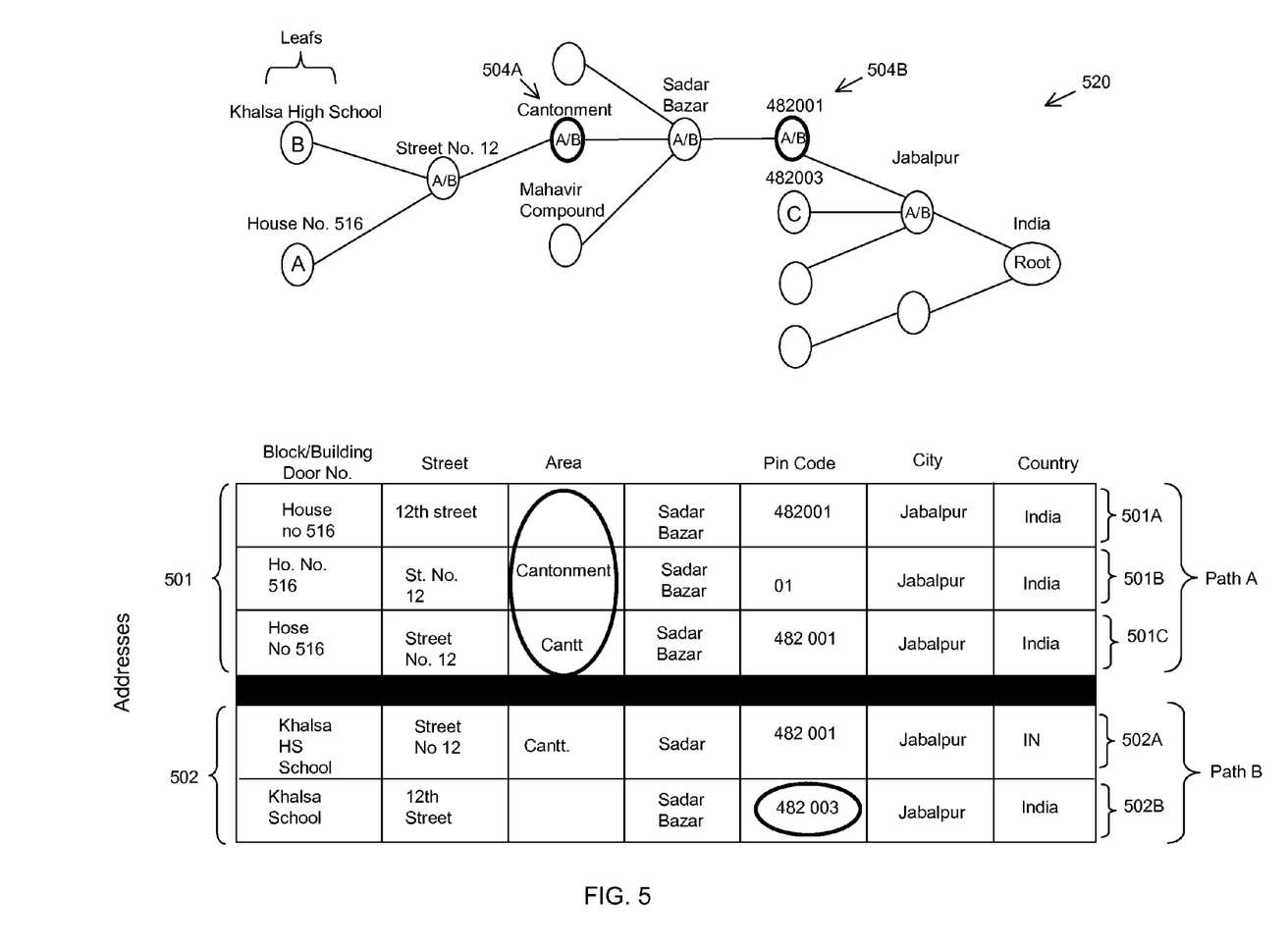
FIG. 5 illustrates an example of a relationship between addresses and variants thereof and a taxonomy.

FIG. 5 illustrates relationships between a taxonomy and addresses. This relationship can be utilized to provide missing value-filling operations. Two addresses 501, 502 are illustrated. Address 501 has three variants, while address 502 has two variants. The addresses 501, 502 are again stored as separated elements in a table 510. Here, address variant 501A and 501C each have variations in the Area element, which can read "Cantonment" (used as a landmark), as in address variant 504B and as represented in taxonomy path node 504A. However, address variant 501A is completely missing such an entry for the Area element, whereas address variant 501C contains an abbreviation "Cantt". Because embodiments match address entries to the best path in the taxonomy, abbreviations such as used in variant 501A and omissions such as in variant 501C will not prevent matching of address variants 501A-501C to path A in the taxonomy 520.

Likewise, address variant 502A contains a correct pin code "482 003", albeit in as a variation of the taxonomy pin code for path B "482003". Again, because embodiments can match an address entry such as variant 502B to a best path in the taxonomy 520 through the leaf nodes, an incorrect element entry will not be problematic overall, as the correct element value will be identified as being part of the correct path.

Figure 6:
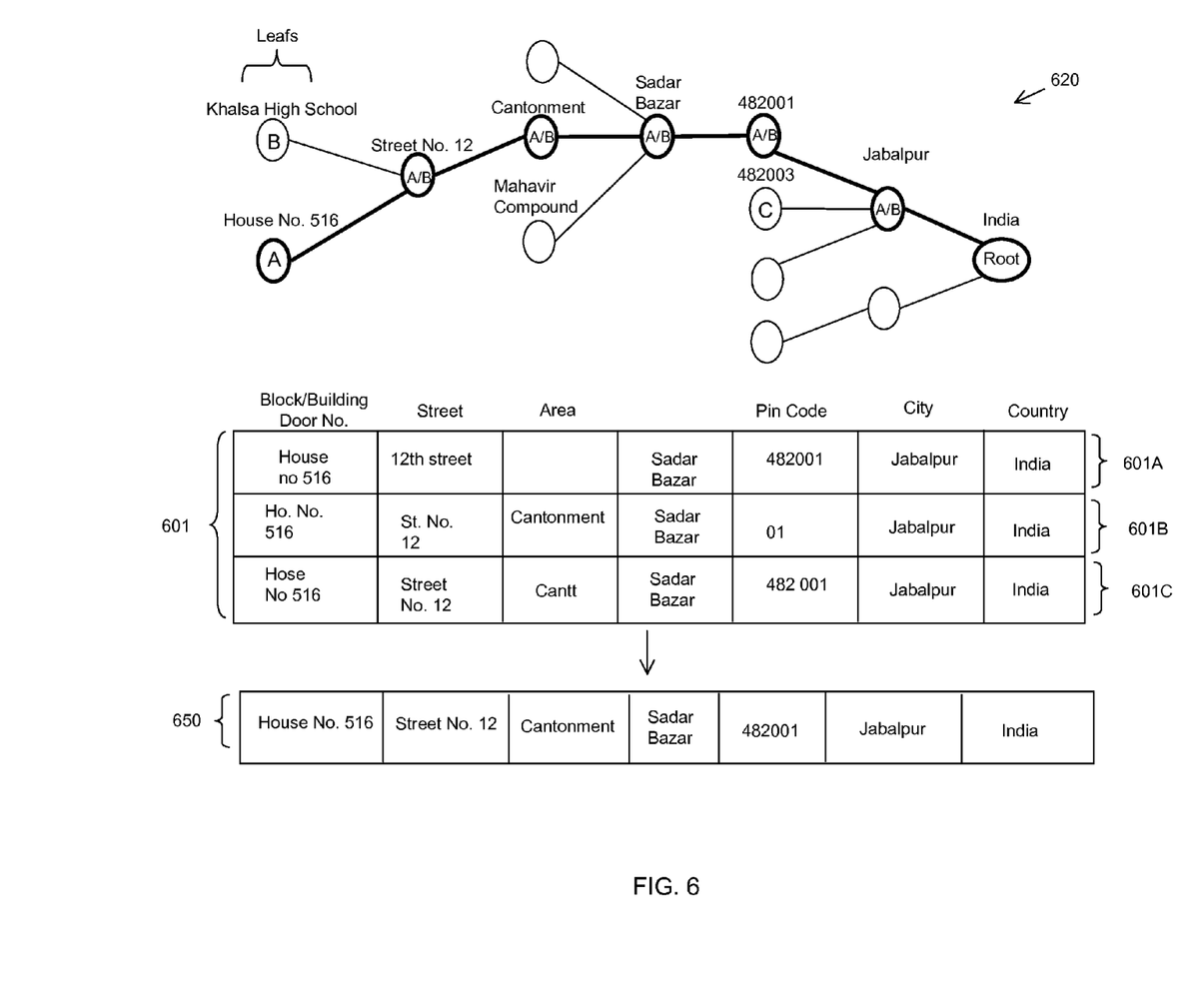
FIG. 6 illustrates an example of a relationship between addresses and variants thereof and a taxonomy and address standardization.

Referring to FIG. 6, an example of de-duplication of variant address entries is illustrated. Three variant address entries 601A, 601B, 601C of a given address 601 are illustrated. Embodiments match the address variants 601A, 601B, 601C to taxonomy leaf "House No. 516", which is part of path A. Once the variants 601A, 601B, 601C are known to match taxonomy leaf "House No. 516", a standardized form 650 of the address variants 601A, 601B, 601C can be formed as and stored. Thus, embodiments utilize the taxonomy form as the standardized form 650.

Figure 7:
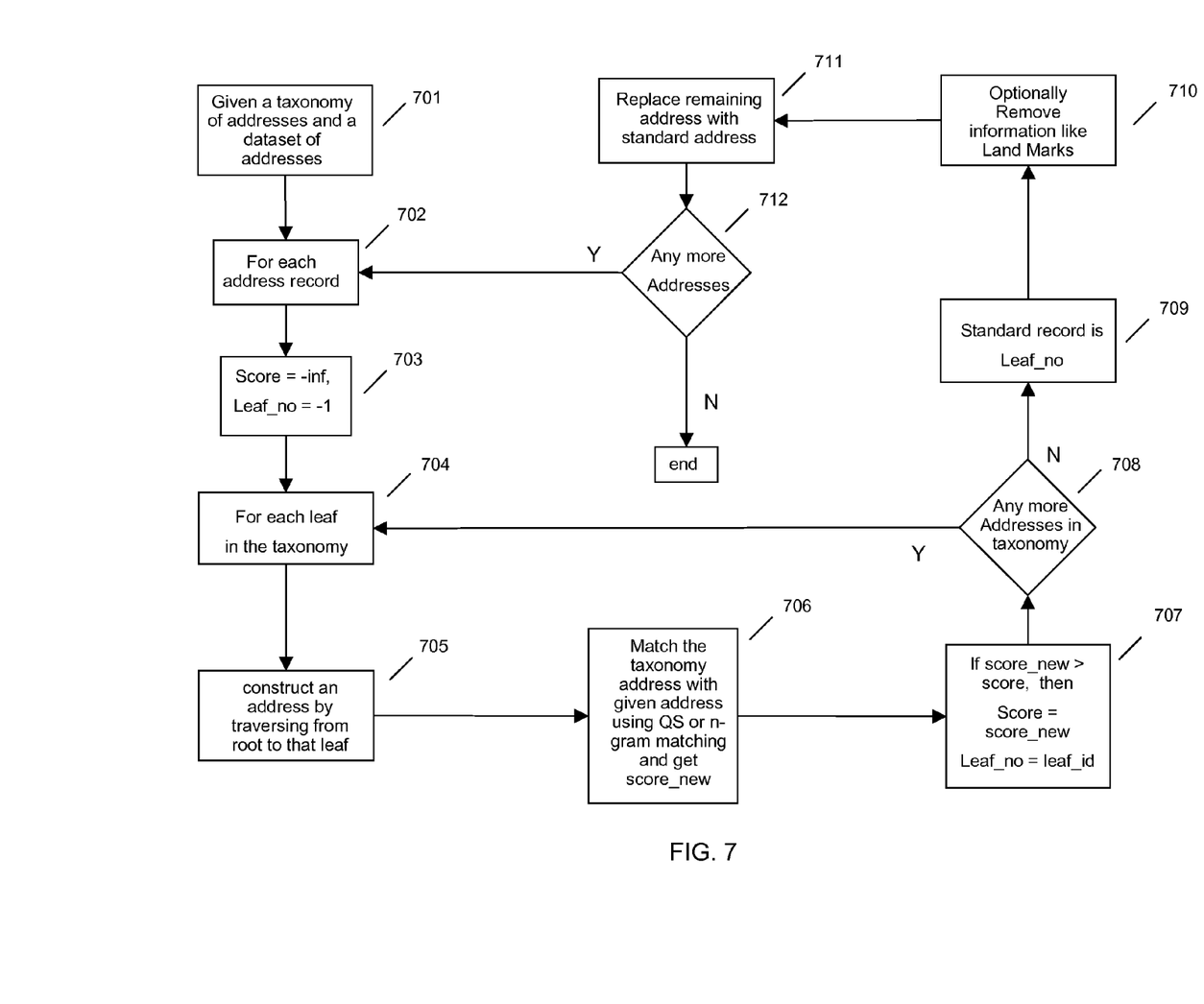
FIG. 7 illustrates an example method of address standardization.

Referring to FIG. 7, an example of taxonomy leaf and address entry matching is illustrated. Given a taxonomy of addresses and a dataset of addresses 701, for each address (record) in the data set 702, a score is initialized 703 for the address matching (for example, set a score for the address entry to Score=−∞, Leaf_no=−1). For each leaf in the taxonomy 704, an address representation is constructed 705 (for example using n-grams) for the path (traversing from the root node to the leaf). A signature is created for the leaf (which is unique in the taxonomy) which can be used for matching. Once a signature for the leaf is obtained, the taxonomy address (leaf signature) is matched 706 with the given address entry (using n-gram or IBM Quality Stage™ (QS) matching, or any other viable technique), to get a new score for the particular address entry/taxonomy address pair.

If the new score exceeds a previously calculated score (for another taxonomy address), then the new score is used 707 and the leaf number is used to identify the path (taxonomy address) currently best matching the address entry. If there are more leafs (representing addresses) in the taxonomy 708, the process is repeated to determine which leaf best matches the given address entry. If no, the standard record created is that of the leaf number applied in step 707. Additional information can optionally be removed 710, such as landmark elements. Thus, the address entry can be replaced 711 with a standardized address from the taxonomy match. If there are no more address entries in the data set 712, the process ends. If there are more address entries, the process can be repeated for each (step to 702 for the new address entry).

Figure 8:
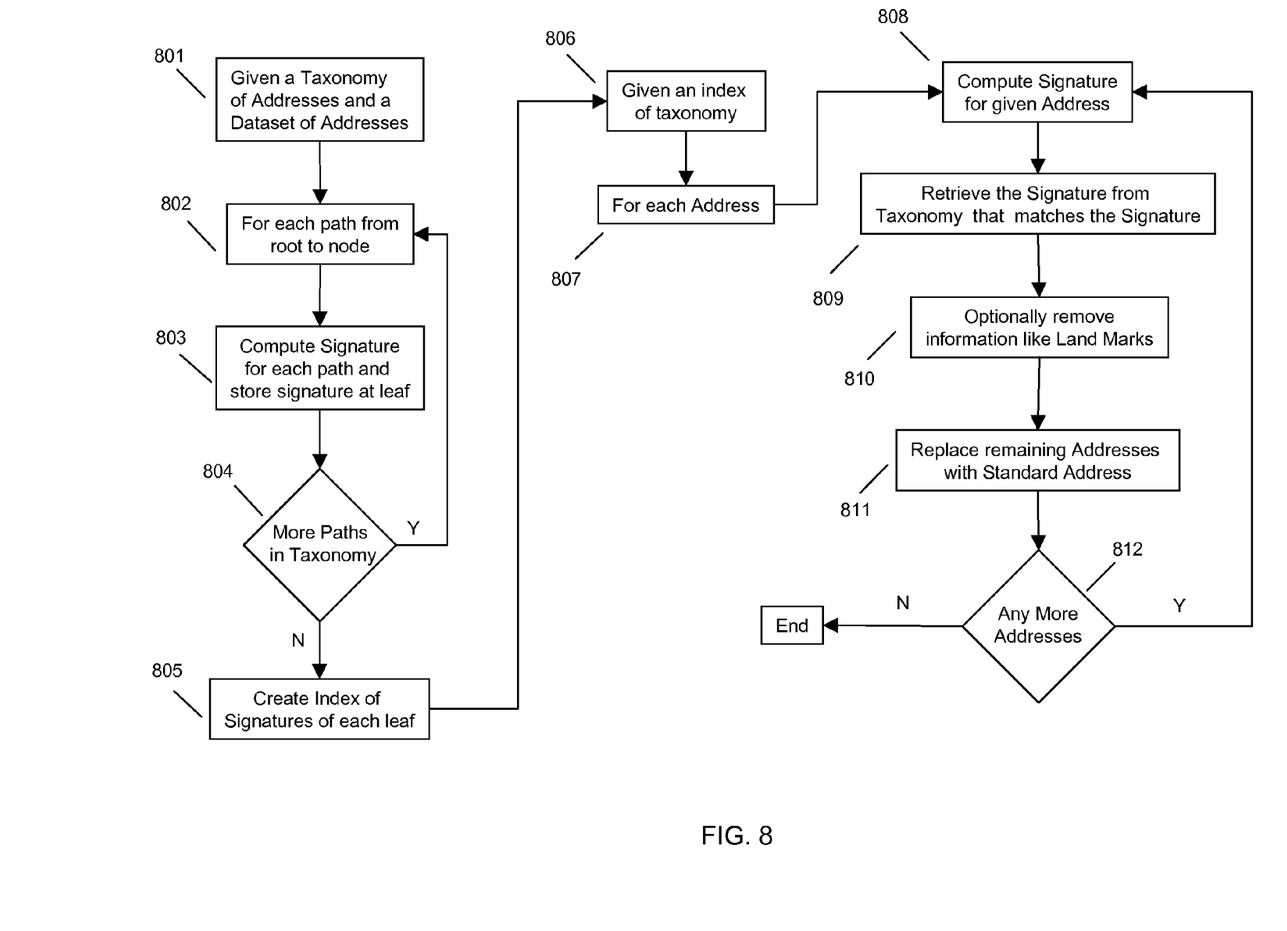
FIG. 8 illustrates an example method of address standardization.

To reduce computation complexity, certain embodiments create leaf indexes for taxonomies. Referring to FIG. 8, given a taxonomy of addresses and a data set of addresses 801, for each path from the root node (to each leaf node) 802, a signature is computed for each path and the signatures are stored at each leaf 803. If there are more paths in the taxonomy 804, the process is repeated to generate new signature(s). If no, an index of signatures for the leafs of that taxonomy is created 805.

Thus, given an index of a taxonomy 806, for each address 807, a signature is computed for each address 808. A signature is retrieved form the taxonomy that matches the signature 809. Optionally, additional information such as landmarks can be removed 810. Thus, given the leaf signature, the address entry elements can be replaced with standardized elements corresponding to the leaf of the taxonomy 811. If there are more addresses 812, the process can be repeated, otherwise it ends.

To briefly recapitulate, embodiments exploit a common context in the taxonomy and a given address to detect and correct deviations in the address. Embodiments establish a possible path from a root of the taxonomy to a leaf in the taxonomy that can possibly generate a given address. In leaf nodes of the taxonomy, embodiments store a set of representations (for example, n-grams or signatures) of that path. Given a new address, embodiments compute the representation (for example, n-grams) of the new address and find a closest matching leaf in the taxonomy. Embodiments then traverse the path to detect the agreement and disagreements. A taxonomic structured is used to detect, segregate and standardize the expected fields. Any extra/additional information that is detected can be included/excluded as optional information as desired.

Figure 9:
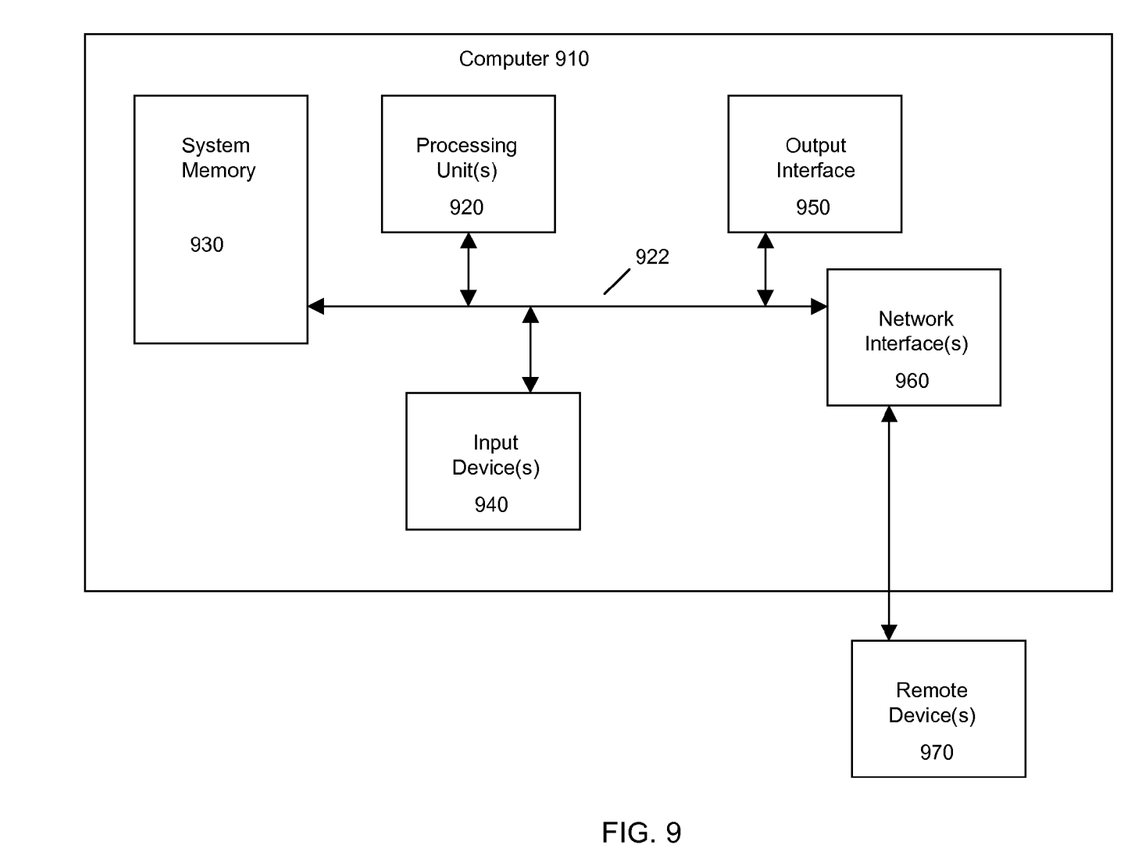
FIG. 9 illustrates an example computer system.

Referring to FIG. 9, it will be readily understood that certain embodiments can be implemented using any of a wide variety of devices or combinations of devices. An example device that may be used in implementing one or more embodiments includes a computing device in the form of a computer 910. In this regard, the computer 910 may execute program instructions configured to populate a taxonomy, access datasets of addresses, perform standardization operations, and perform other functionality of the embodiments, as described herein.

Components of computer 910 may include, but are not limited to, a processing unit 920, a system memory 930, and a system bus 922 that couples various system components including the system memory 930 to the processing unit 920. The computer 910 may include or have access to a variety of computer readable media. The system memory 930 may include computer readable storage media in the form of volatile and/or nonvolatile memory such as read only memory (ROM) and/or random access memory (RAM). By way of example, and not limitation, system memory 930 may also include an operating system, application programs, other program modules, and program data.

A user can interface with (for example, enter commands and information) the computer 910 through input devices 940. A monitor or other type of device can also be connected to the system bus 922 via an interface, such as an output interface 950. In addition to a monitor, computers may also include other peripheral output devices. The computer 910 may operate in a networked or distributed environment using logical connections to one or more other remote computers or databases. The logical connections may include a network, such local area network (LAN) or a wide area network (WAN), but may also include other networks/buses, including audio channel connections to other devices.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider, or the connection may be made for example to a client device (such as a standard telephone) via a audio channel connection.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method comprising:
utilizing one or more processors to execute a program of instructions configured to:
create a stored taxonomy representing addresses, the taxonomy comprising a plurality of nodes, wherein the plurality of nodes comprise an element of an address, the plurality of nodes including a plurality of leaf nodes representing an element of an address unique to a predetermined address and at least one root node representing an element of an address shared by the addresses of the taxonomy;
determine an n-gram representation of one or more paths of the taxonomy, each n-gram representation comprising at least one n-gram for each node in the path from a leaf node to a root node;
receive one or more address entries as input;
compute a signature for the one or more address entries, the signature for the one or more address entries comprising an n-gram representation;
access the stored taxonomy;
match, using a similarity computation, the signature from the one or more address entries with at least one n-gram representation, wherein the matching comprises:

identifying at least two leaf nodes as variations of an element of the one or more address entries; and comparing between the two leaf nodes and determining, based upon the similarity computation, the leaf node having a highest similarity level to the element of the one or more address entries;

trace a path in the taxonomy from the leaf node having the highest similarity level to the root node, wherein the path is based upon the matched n-gram representation corresponding to a path of leaf nodes having the highest similarity to each of the elements in the one or more address entries, and identify, based upon the traced path, the elements of the address corresponding to the one or more address entries; and standardize the one or more address entries based on the traced path in the taxonomy.

2. The method according to claim 1, wherein the taxonomy comprises one or more representations of addresses as a tree structure, wherein the tree structure comprises a root node, one or more leaf nodes, and one or more intermediate nodes.

3. The method according to claim 2, wherein the root node, the one or more leaf nodes and the one or more intermediate nodes correspond to one or more address elements.

4. The method according to claim 3, wherein a path from a root node to a leaf node within said tree represents an address.

5. The method according to claim 4, wherein to match the signature from the one or more address entries with one or more signatures of addresses of the taxonomy further comprises identifying a leaf node signature matching the signature from the one or more address entries.

6. The method according to claim 5, further comprising:
responsive to identifying a leaf node signature matching the signature from the one or more address entries, identifying the path to the root node in said tree.

7. The method according to claim 6, wherein to standardize the one or more address entries based on the taxonomy further comprises:
comparing one or more node values of said path to one or more element values of said one or more address entries; and
responsive to identifying a mismatch between said one or more node values of said path and one or more element values of said one or more address entries, replacing said one or more element values with said one or more node values.

8. The method according to claim 1, further comprising: de-duplicating one or more redundant address entries based on a standard derived from said taxonomy.

9. A computer program product comprising:
a non-transitory computer readable storage medium having computer readable program code embodied therewith, the computer readable program code comprising:
computer readable program code configured to create a stored taxonomy representing addresses, the taxonomy comprising a plurality of nodes, wherein the plurality of nodes comprise an element of an address, the plurality of nodes including a plurality of leaf nodes representing an element of an address unique to a predetermined address and at least one root node representing an element of an address shared by the addresses of the taxonomy;
computer readable program code configured to determine an n-gram representation of one or more paths of the taxonomy, each n-gram representation comprising at least one n-gram for each node in the path from a leaf node to a root node;
computer readable program code configured to receive one or more address entries as input;
computer readable program code configured to compute a signature for the one or more address entries, the signature for the one or more address entries comprising an n-gram representation;
computer readable program code configured to access the stored taxonomy;
computer readable program code configured to match, using a similarity computation, the signature from the one or more address entries with at least one n-gram representation, wherein the matching comprises:
identifying at least two leaf nodes as variations of an element of the one or more address entries; and
comparing between the two leaf nodes and determining, based upon the similarity computation, the leaf node having a highest similarity level to the element of the one or more address entries;
computer readable program code configured to trace a path in the taxonomy from the matching leaf node having the highest similarity level to the root node, wherein the path is based upon the matched n-gram representation corresponding to a path of leaf nodes having the highest similarity to each of the elements in the one or more address entries, and identify, based upon the traced path, the elements of the address corresponding to the one or more address entries; and
computer readable program code configured to standardize the one or more address entries based on the traced path in the taxonomy.

10. The computer program product according to claim 9, wherein the taxonomy comprises one or more representations of addresses as a tree structure, wherein the tree structure comprises a root node, one or more leaf nodes, and one or more intermediate nodes.

11. The computer program product according to claim 10, wherein the root node, the one or more leaf nodes and the one or more intermediate nodes correspond to one or more address elements.

12. The computer program product according to claim 11, wherein a path from a root node to a leaf node within said tree represents an address.

13. The computer program product according to claim 12, wherein to match the signature from the one or more address entries with one or more signatures of addresses of the taxonomy further comprises identifying a leaf node signature matching the signature from the one or more address entries.

14. The computer program product according to claim 13, further comprising computer readable program code configured to:
responsive to identifying a leaf node signature matching the signature from the one or more address entries, identify the path to the root node in said tree.

15. The computer program product according to claim 14, wherein to standardize the one or more address entries based on the taxonomy further comprises:
comparing one or more node values of said path to one or more element values of said one or more address entries; and
responsive to identifying a mismatch between said one or more node values of said path and one or more element values of said one or more address entries, replace said one or more element values with said one or more node values.

16. The computer program product according to claim 9, further comprising computer readable program code configured to:
de-duplicate one or more redundant address entries based on a standard derived from said taxonomy.

17. A system comprising:
one or more processors; and
a memory operatively connected to the one or more processors;
wherein, responsive to execution of computer readable program code accessible to the one or more processors, the one or more processors are configured to:
create a stored taxonomy representing physical addresses, the taxonomy comprising a plurality of nodes, wherein the plurality of nodes comprise an element of a physical address, the plurality of nodes including a plurality of leaf nodes representing an element of a physical address unique to a predetermined physical address and at least one root node representing an element of a physical address shared by the physical addresses of the taxonomy;
determine an n-gram representation of one or more paths of the taxonomy, each n-gram representation comprising at least one n-gram for each node in the path from a leaf node to a root node;
receive one or more physical address entries as input;
compute a signature for the one or more physical address entries, the signature for the one or more physical address entries comprising an n-gram representation;
access the stored taxonomy;
match, using a similarity computation, the signature from the one or more physical address entries with at least one n-gram representation, wherein the matching comprises:
identifying at least two leaf nodes as variations of an element of the one or more physical address entries; and
comparing between the two leaf nodes and determining, based upon the similarity computation, the leaf node having a highest similarity level to the element of the one or more physical address entries; and
trace a path in the taxonomy from the leaf node having the highest similarity level to the root node, wherein the path is based upon the matched n-gram representation corresponding to a path of leaf nodes having the highest similarity to each of the elements in the one or more physical address entries, and identify, based upon the traced path, the elements of the physical address corresponding to the one or more physical address entries; and
standardize the one or more physical address entries based on the traced a path in the taxonomy.

18. The system according to claim 17, wherein the taxonomy comprises one or more representations of addresses as a tree structure, wherein the tree structure comprises a root node, one or more leaf nodes, and one or more intermediate nodes, and further wherein a path from a root node to a leaf node represents an address.

* * * * *